United States Patent
Kabra et al.

(10) Patent No.: US 11,526,824 B2
(45) Date of Patent: Dec. 13, 2022

(54) SYSTEMS AND METHODS FOR MEASURING EFFECTIVENESS OF FEATURE CHANGES MADE WITHIN A STORE

(71) Applicant: Walmart Apollo, LLC, Bentonville, AR (US)

(72) Inventors: Paridhi Kabra, Indore (IN); Prateek Mishra, Ghaziabad (IN); Jingying Zhang, Beaumont, TX (US); Nitin Kapoor, Kota (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/931,052

(22) Filed: May 13, 2020

(65) Prior Publication Data
US 2020/0364644 A1    Nov. 19, 2020

Related U.S. Application Data

(60) Provisional application No. 62/893,276, filed on Aug. 29, 2019.

(30) Foreign Application Priority Data

May 13, 2019    (IN) .............................. 201911018963

(51) Int. Cl.
*G06Q 10/06* (2012.01)
*G06N 20/00* (2019.01)
*G06Q 50/28* (2012.01)

(52) U.S. Cl.
CPC ....... *G06Q 10/06375* (2013.01); *G06N 20/00* (2019.01); *G06Q 10/067* (2013.01); *G06Q 50/28* (2013.01)

(58) Field of Classification Search
None
See application file for complete search history.

(56) References Cited

U.S. PATENT DOCUMENTS

| | | | |
|---|---|---|---|
| 9,336,493 B2 * | 5/2016 | Lee | G06Q 10/04 |
| 2005/0283511 A1 * | 12/2005 | Fan | G06F 11/008 |
| | | | 708/321 |

(Continued)

FOREIGN PATENT DOCUMENTS

| | | | | |
|---|---|---|---|---|
| EP | 3336640 A1 * | 6/2018 | ......... | G05B 23/0237 |
| WO | WO-2019013743 A1 * | 1/2019 | ............ | G06N 5/04 |

OTHER PUBLICATIONS

Pattnaik et al., How Predictive Analytics is Changing the Retail Industry, InInternational Conference on Management and Information Systems September, vol. 23, p. 24, 2016 http://www.icmis.net/icmis16/ICMIS16CD/pdf/S154.pdf (Year: 2016).*

*Primary Examiner* — Octavian Rotaru
(74) *Attorney, Agent, or Firm* — Fitch, Even, Tabin & Flannery LLP

(57) ABSTRACT

Systems and methods for determining whether a particular feature or change implemented in at least one test store causes a significant change as compared to one or more control stores are discussed. More particularly, techniques for using a time-series clustering algorithm to identify comparable sister stores to a store in which a feature change is being considered are described. Once the sister stores are identified a testing module can perform an A/B testing so as to validate whether a particular feature change being implemented in the test store causes a significant change as compared to the control stores.

16 Claims, 9 Drawing Sheets

(56) References Cited

U.S. PATENT DOCUMENTS

2020/0273052 A1\* 8/2020 Ganti ................. G06Q 30/0204
2020/0294067 A1\* 9/2020 Ghosh ................. G06K 9/6262

\* cited by examiner

SYSTEMS AND METHODS FOR MEASURING EFFECTIVENESS OF FEATURE CHANGES MADE WITHIN A STORE

CROSS-REFERENCE TO RELATED APPLICATION

This application is related to Indian Patent Application No. 201911018963, filed on May 13, 2019, and U.S. Provisional Application No. 62/893,276, filed Aug. 29, 2019, both of which are hereby incorporated by reference herein in their entirety.

BACKGROUND

Stores continually evolve and change over time. Stores are regularly reconfigured in order to address differing customer needs, especially in competitive markets with fragmented customer expectations and city environment changes. For example, a reconfiguration of a store may involve a change in a store regarding a product price, a product location, a product-related service, and/or product availability.

BRIEF DESCRIPTION OF DRAWINGS

To assist those of skill in the art in making and using the system and associated methods described herein, reference is made to the accompanying figures. The accompanying figures, which are incorporated in and constitute a part of this specification, illustrate one or more embodiments of the present disclosure and, together with the description, help to explain the present disclosure. Illustrative embodiments are shown by way of example in the accompanying drawings and should not be considered as limiting. In the figures.

DETAILED DESCRIPTION

Figure 1:
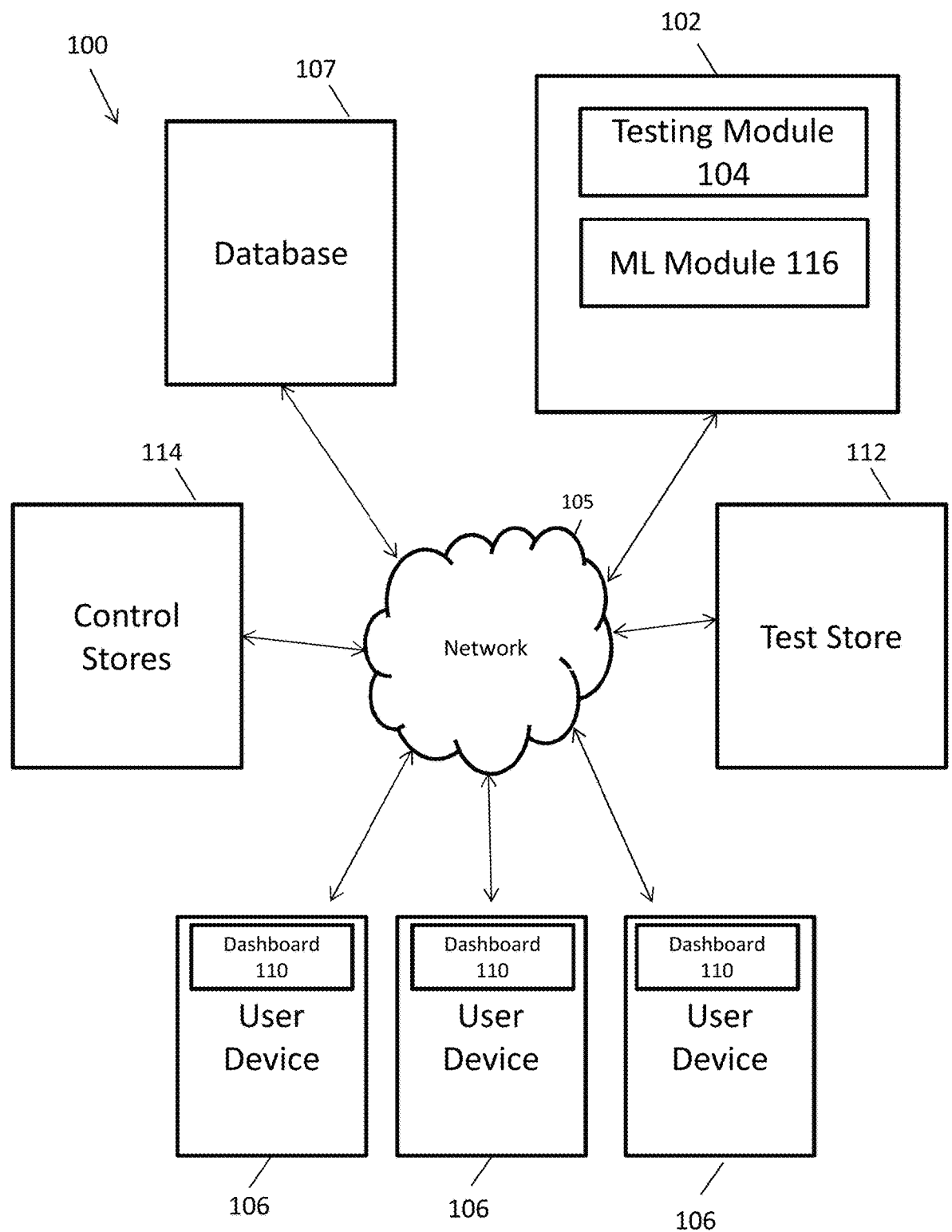
FIG. 1 illustrates an exemplary computer network, in accordance with an exemplary embodiment.

Retail is a fast changing business and as a result, stores often attempt to become early adopters of processes or technology occurring in the retail landscape. For large-scale operations, it becomes important to make decisions based on data. Therefore, measuring the impact of change is important.

Embodiments of the present invention execute a computing device-implemented testing module to perform Dynamic Time Warping (DTW), a time series clustering algorithm, to identify comparable sister stores to a store in which a feature change is being considered. The feature change may take a number of forms including, but not limited to a change in product price, product location, product-related service, or product availability. Once the sister stores are identified the testing module can perform an A/B testing so as to validate whether a particular feature change being implemented in the test store causes a significant change as compared to the control stores. A user can view various details regarding the test, such as but not limited to a lift of the test store, whether the difference is statistically significant or not, a distribution of stores according to lifts etc. The results assist the user in deciding whether the particular feature should be rolled out or not in the particular store for which the feature change is being considered.

Accordingly, described in detail herein are methods and systems for determining whether a particular feature or change implemented in at least one test store causes a significant change as compared to one or more control stores. In one embodiment, a system includes at least one data storage device holding data sets. Each data set is associated with a store of a group of stores. Each store is associated with a store identifier. The system further includes a dashboard display configured to receive as input a feature to test and at least one store identifier associated with at least one test store in which to test the feature. The feature being tested is at least one of a change in product price, product location, product-related service, and/or product availability. The dashboard display is further configured to display measurements associated with the feature implemented in the test store. The dashboard display includes one or more user interfaces as described herein. The system also includes a computing device communicatively coupled to the data storage device and the dashboard display. The computing device is equipped with one or more processors and configured to execute a testing module. The testing module when executed receives data associated with the store identifier for the test store and data associated with potential control stores. The testing module identifies one or more control stores for the test store using Dynamic Time Warping (DTW) to rank a similarity of potential control stores to the test store. The control stores have comparable measurement values and follow a similar trend over a period of analysis as the test store based on a result of the DTW. The testing module receives at least one result from testing out the feature in the test store after the control stores are identified. In one aspect, the result is evaluated based on at least one of sales data, footfalls, or wait time. The testing module determines whether the result of testing the feature in the test store is a change that is statistically significant from a related feature in the control stores. The testing module displays, via the dashboard display, a result of determining whether the change made in the test store is statistically significant.

FIG. 1 illustrates an exemplary network 100 suitable for the described methods and systems, in accordance with an exemplary embodiment. The network 100 includes a computing system 102 configured to execute a testing module 104. The testing module 104 communicates, via a communications network 105, with one or more user devices 106 and one or more databases 107. Each user device 106 executes a dashboard display 110. The dashboard display 110 may include webpages or an application, such as a mobile application and/or a web application. In some embodiments, the system 102 includes a machine-learning module 116 for performing machine learning, as described herein. The network 100 further includes a test store 112 in which the feature testing is performed and/or within the control stores 114.

The communications network 105 can be any network over which information can be transmitted between devices communicatively coupled to the network. For example, the communication network 105 can be the Internet, an Intranet, virtual private network (VPN), wide area network (WAN), local area network (LAN), and the like.

Figure 2A:
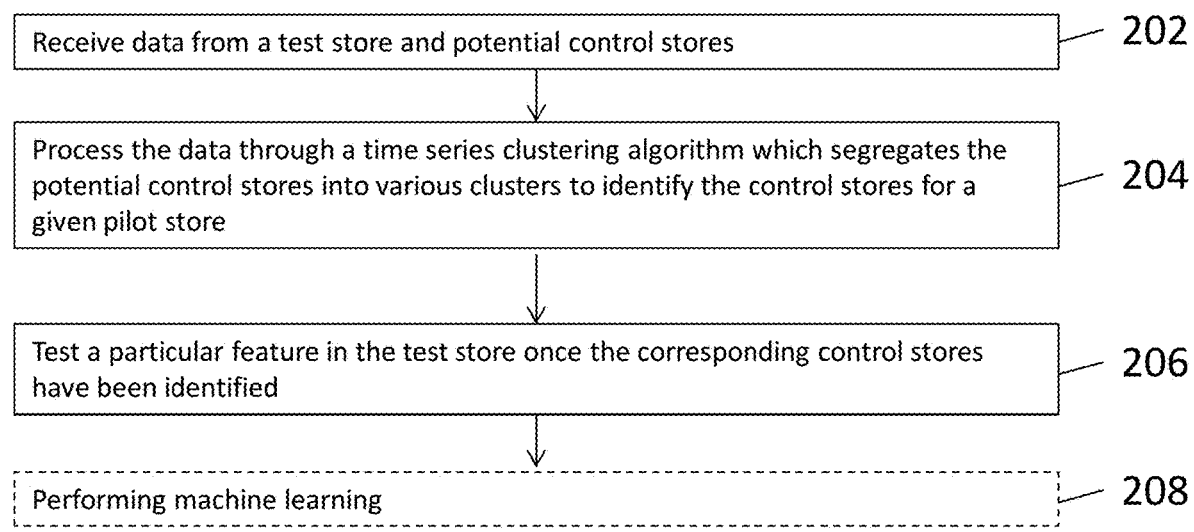
FIG. 2A-2B illustrates a method for measuring an impact of features implemented in test stores, in accordance with an exemplary embodiment.

FIG. 2A illustrates an exemplary method 200 for measuring an impact of feature testing in one or more test stores, in accordance with an exemplary embodiment. In one exemplary embodiment, a method 200 includes five phases: (step 202); retrieving data for a test store and potential control stores, (step 204); identifying one or more control stores by processing data associated with the test store and the potential control stores through a time series clustering algorithm which segregates the potential control stores into various clusters to identify the control stores for a given pilot store (i.e., control store identification); (step 206) receiving results from testing out a particular feature in the test store once the corresponding control stores have been identified; determining whether the result is a statistically important change by, for example, performing AB testing of features (step 208) and displaying the result of the determination via dashboard display (step 210).

In step 202, a user inputs an identifier for a given test store into a dashboard display. The computing system, particularly the testing module, retrieves relevant data for the test store and potential control stores from one or more databases.

In step 204, the testing module identifies the control stores for a given test store. The control stores are stores having comparable measure (variable) values as well as following a similar trend over the period of analysis. Using these criteria for identifying similar stores, the testing module clusters the time series (measure values) into similar groups.

Conventional statistical methods for identifying comparable stores such as k-nearest neighbors algorithm (KNN) and Euclidian distance may identify comparable values, but may ignore the trend or shape of the time series. The testing module described herein incorporates dynamic time warping (DTW), which is a time series clustering algorithm that works equally well on similar as well as non-similar length time series. For the purpose of identifying comparable stores to be used as a control, DTW performs better than other Euclidean distance based approaches like KNN because DTW determines the shape of the time series data & does not average.

The testing module, when identifying the one or more control stores, processes data associated with one or more possible control stores using the DTW algorithm, which segregates the one or more control stores into various clusters. The testing module then uses the processed data as criteria to generate the one or more control stores for the test store. More particularly, the testing module uses DTW to compute dynamic time warp and find optimal alignment between two time series in order to rank the similar stores (i.e., the control stores). The similarity of the time series is measured in terms of a distance value. The lower the distance the more similar a store is to a given store. The DTW algorithm computes the stretch of the time axis which optimally maps one given time series (query) onto whole or part of another (reference). This yields the remaining cumulative distance after the alignment and the point-by-point correspondence (warping function). Although, the description herein describes the use of DTW by some embodiments to perform the identification of the control stores, it should be appreciated that other embodiments may use other time-series clustering algorithms In step 206, once the control stores are identified, the testing module receives results from testing out the feature in the test store. These results may be, but are not limited to, testing out changes in a product price, a product location, a product-related service and/or product availability. Following the receipt of the results, the testing module performs feature testing in step 208, to perform an A/B testing to validate whether a particular feature or change being implemented in the test store causes a significant change as compared to the control stores. AB testing is used to compare the test stores against the control stores. In particular, AB testing is used to compare two versions of a feature to determine which version performs better. The AB testing may accept or reject the Null Hypothesis using 2 tailed ttest, computes a lift due to the change, and determine whether it is significant. Lift is the percentage difference in conversion rate between the control stores and a successful test store.

In step 210, the testing module displays results. In one embodiment, the testing module displays the results via a dashboard display. On the display, a user can view various details regarding the test, for example, a lift of the test store, whether the difference is statistically significant or not, and distribution of stores according to lifts. As a result, the user can decide whether the particular feature or change should be implemented.

In some embodiments, the system includes a machine-learning module for performing machine learning. For example, in performing the identifying of control stores, of step 204, the machine-learning module may use machine learning to segregate one or more control stores into similar clusters based on predefined factors, such as the store type, number of prescriptions, state law, etc. The machine learning module segregates the control stores by a time series clustering algorithm which continuously evaluates each control store and then decided which cluster should this particular store falls into. The machine learning module changes the predefined factors and the algorithm is run again to re-segregate the one or more control stores. This is repeated until an optimal solution is achieved.

In an exemplary embodiment, the computing kernel of the DTW function is written in the C programming language for efficiency. Alignment computations may be performed rapidly as long as the cross-distance matrices fit in the machine's RAM. For example, a standard quad-core Linux x86-64 PC with 4 GB of RAM and 4 GB of swap computes (using only one core) an unconstrained alignment of 100× 100 time points in 7 ms, 6000×6000 points in under 10 s, and 8000×8000 points (close to the virtual memory limit) in 10 minutes.

The math behind the DTW algorithm is as follows: DTW is a time series alignment algorithm. DTW aims at aligning two sequences of feature vectors by warping the time axis iteratively until an optimal match (according to a suitable metrics) between the two sequences is found. Consider two sequences of feature vectors:

$$A = a_1, a_2, \ldots, a_i, \ldots, a_n$$

$$B = b_1, b_2, \ldots, b_j, \ldots, b_m$$

Figure 2B:
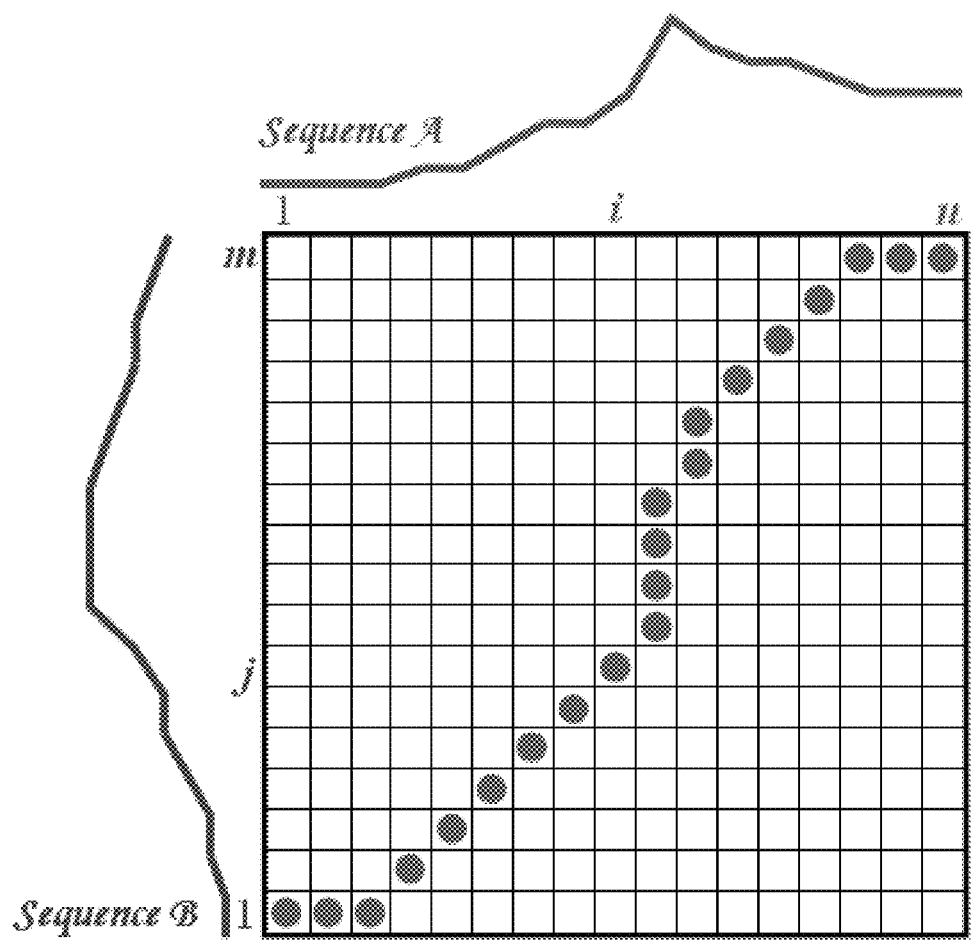

The two sequences can be arranged on the sides of a grid, with one on the top and the other up the left hand side. Both sequences start on the bottom left of the grid, as shown in FIG. 2B.

Inside each cell, a distance measure can be placed, comparing the corresponding elements of the two sequences. To find the best match or alignment between these two sequences, the system finds a path through the grid that minimizes the total distance between them. Computing this overall distance involves finding all possible routes through the grid and, for each route, computing the overall distance. The overall distance is the minimum of the sum of the distances between the individual elements on the path divided by the sum of the weighting function. The weighting function is used to normalize for the path length. It should be appreciated that for any considerably long sequences the number of possible paths through the grid will be very large. The major optimizations or constraints of the DTW algorithm arise from the observations on the nature of acceptable paths through the grid. The DTW algorithm follows certain conditions such as a monotonic condition (the path will not turn back on itself, both the i and j indexes either stay the same or increase, they never decrease), a continuity condition (the path advances one step at a time. Both i and j can only increase by at most 1 on each step along the path), a boundary condition (the path starts at the bottom left and ends at the top right), a warping window condition (a good path is unlikely to wander very far from the diagonal. The distance that the path is allowed to wander is the window width), and a slope constraint condition (the path should not be too steep or too shallow. This prevents short sequences matching too long ones. The condition is expressed as a ratio p/q where p is the number of steps allowed in the same (horizontal or vertical) direction. After p steps in the same direction is not allowed to step further in the same direction before stepping at least q time in the diagonal direction).

In one embodiment, each store is represents by time series data, which is data related to a specified variable, such as, for example, a number of prescriptions filled from that store in a specified period of time. This data is then transformed into a feature vector and then compared with other store's feature vectors based on certain boundary conditions. Once the DTW algorithm runs, an optimal path is selected, which dictates the control stores selected for a particular test store.

Figure 3A:
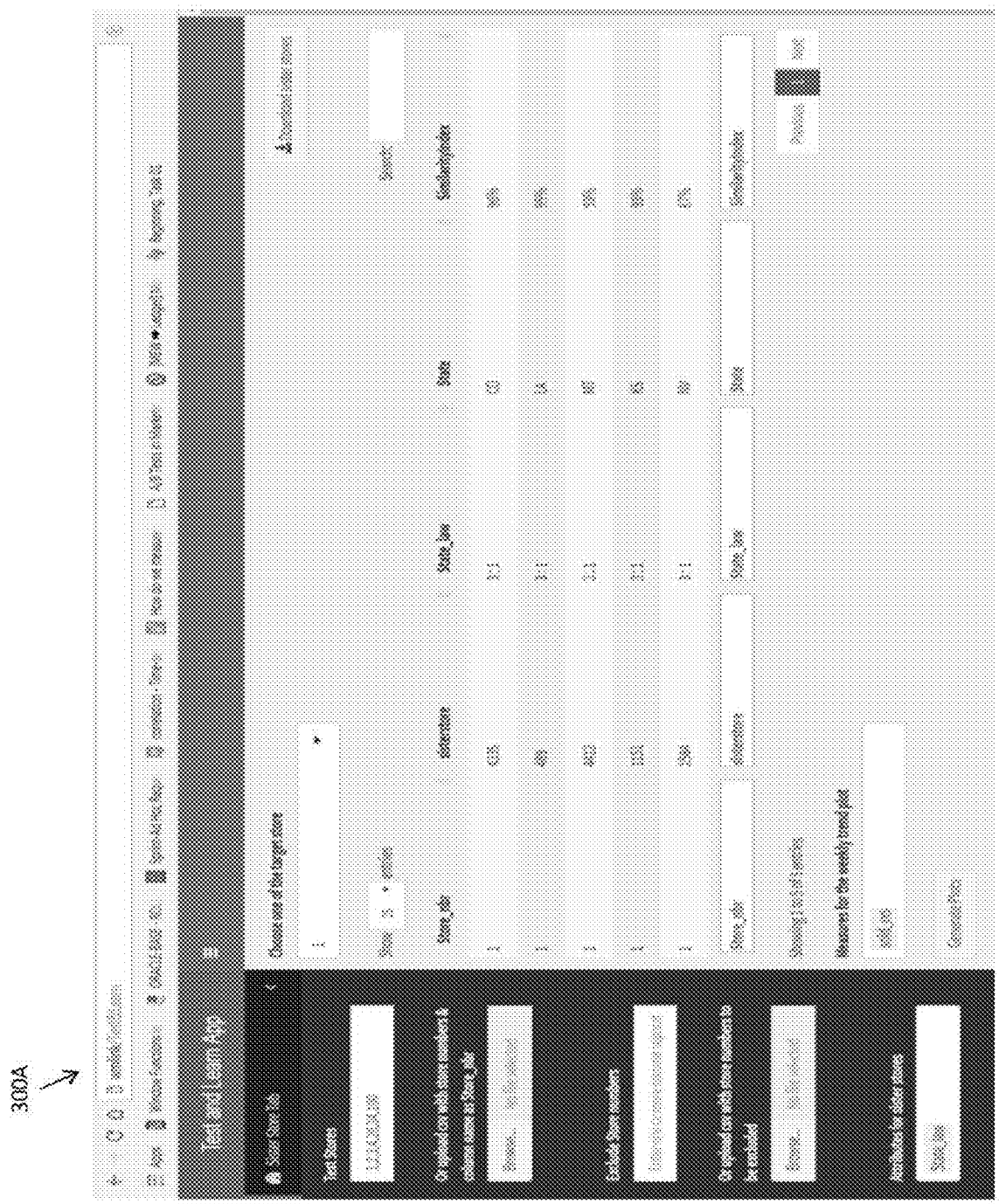
FIGS. 3A-3E illustrate user interfaces in the form of dashboards, in accordance with an exemplary embodiment.

FIG. 3A illustrates a user interface in the form of a dashboard 300A for viewing one or more control stores (or sister stores) for a test store, according to an exemplary embodiment. The dashboard 300A is displayed on a user device and is communicatively coupled to the testing module. The dashboard 300A displays for a chosen test store the one or more control stores. The test store and each sister store is associated with a unique identifier, for example, a specified number. The dashboard 300A includes input boxes for a user to enter test store identifiers and attributes associated with the control stores.

In the displayed embodiment, the dashboard 300A displays control stores for a test store based on a state law attribute. A similarity index for each control store is displayed that represents a similarity between the state law for each control store and the state law for the test store. Here the similarly is displayed as a percentage (e.g., the state laws are 96% similar), although in other embodiments, a different representation may be used.

Figure 3B:
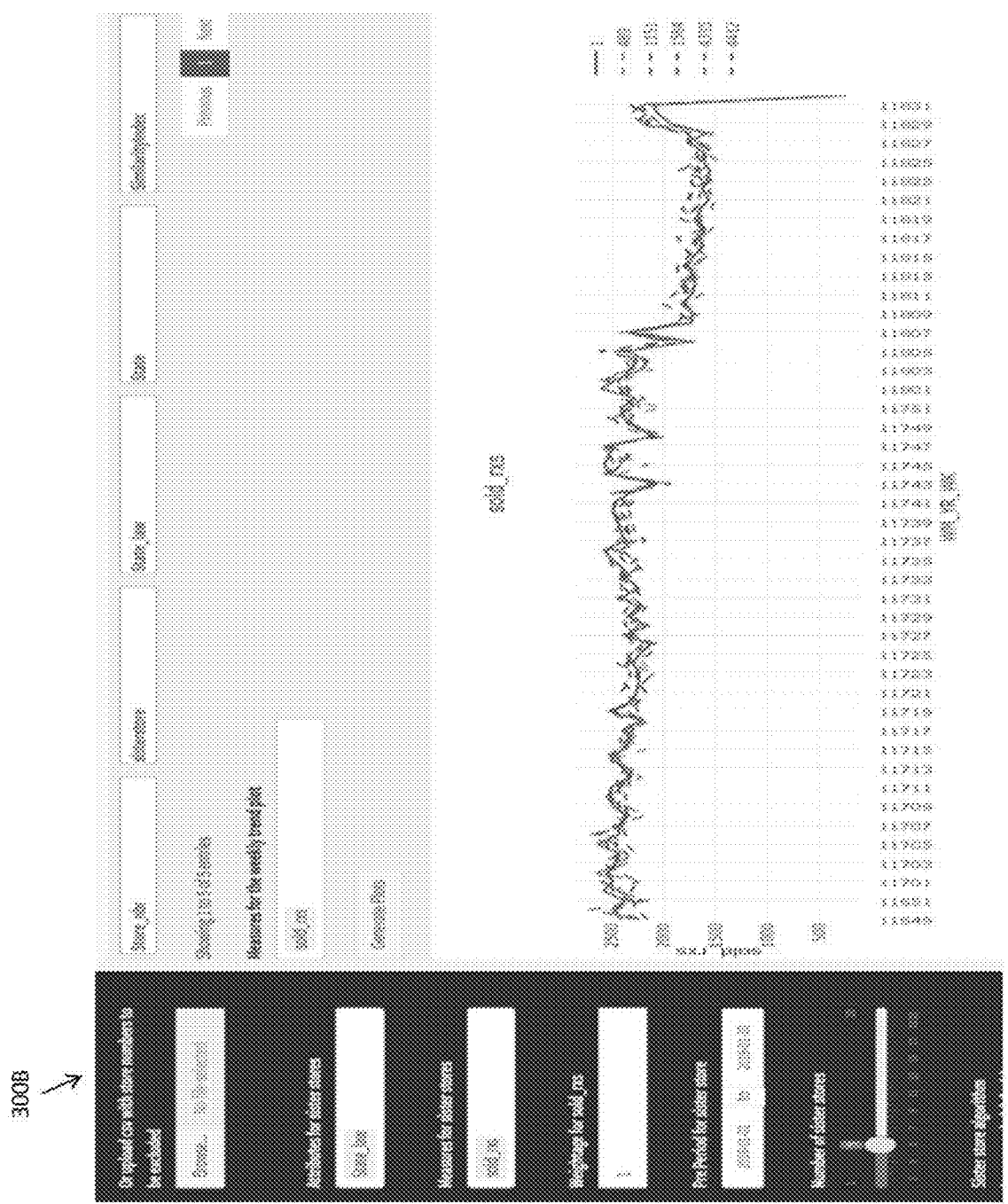

FIG. 3B illustrates another user interface in the form of a dashboard 300B for generating visual data, according to an exemplary embodiment. The dashboard 300B is displayed on the user device and is communicatively coupled to the testing module. A user may input a measurement to display, such as a number of prescriptions sold. The user may then select to generate the visual data, such as a weekly trend plot, as shown in the dashboard 300B. Trend lines are then plotted for the test store and the control stores.

Figure 3C:
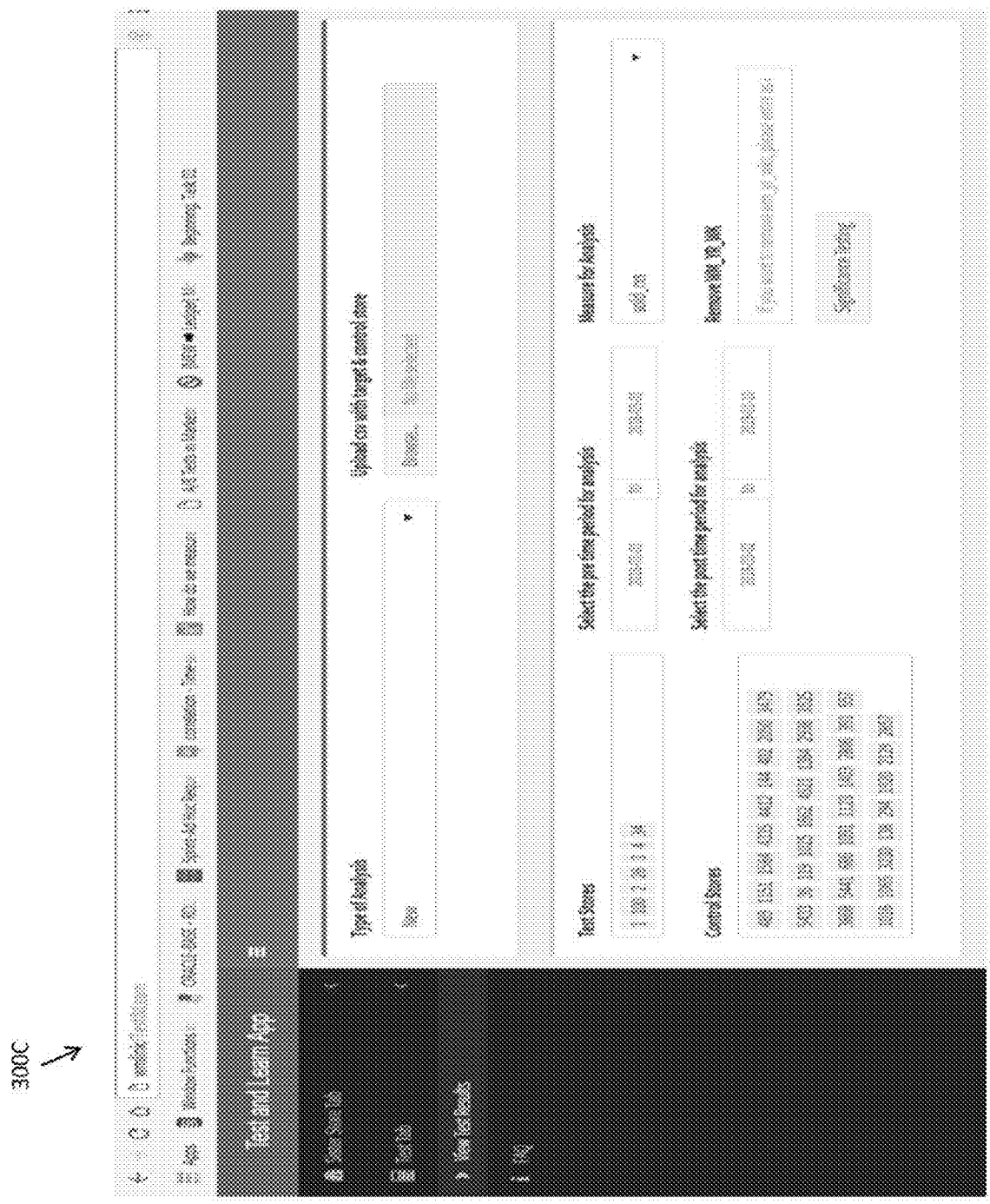

FIG. 3C illustrates a user interface in the form of a dashboard 300C for performing testing to determine whether a feature in the test store is statistically significant from a related feature in the one or more control stores, according to an exemplary embodiment. The dashboard 300C is displayed on the user device and is communicatively coupled to the testing module.

Test stores and control stores are shown in dashboard 300C. A user is able to request the testing module perform testing to determine whether a feature in one or more test stores is statistically significant from a related feature in one or more control stores by entering identifiers for the one or more test stores, entering identifiers for the one or more control stores, entering a pre-time period for analysis before the change (e.g., a beginning date and an ending date), and entering a post-time period for analysis after the change (e.g., a beginning date and an ending date). The user further selects a measure for analysis, for example, historical orders made during a specified time period or a number of prescriptions sold. The user can then select a button on the dashboard 300C to perform the feature testing. The testing module performs the testing based on the information entered into the dashboard 300C. The feature testing is an A/B testing to validate whether a particular feature or change being implemented in the test store causes a significant change as compared to the control stores.

Figure 3D:
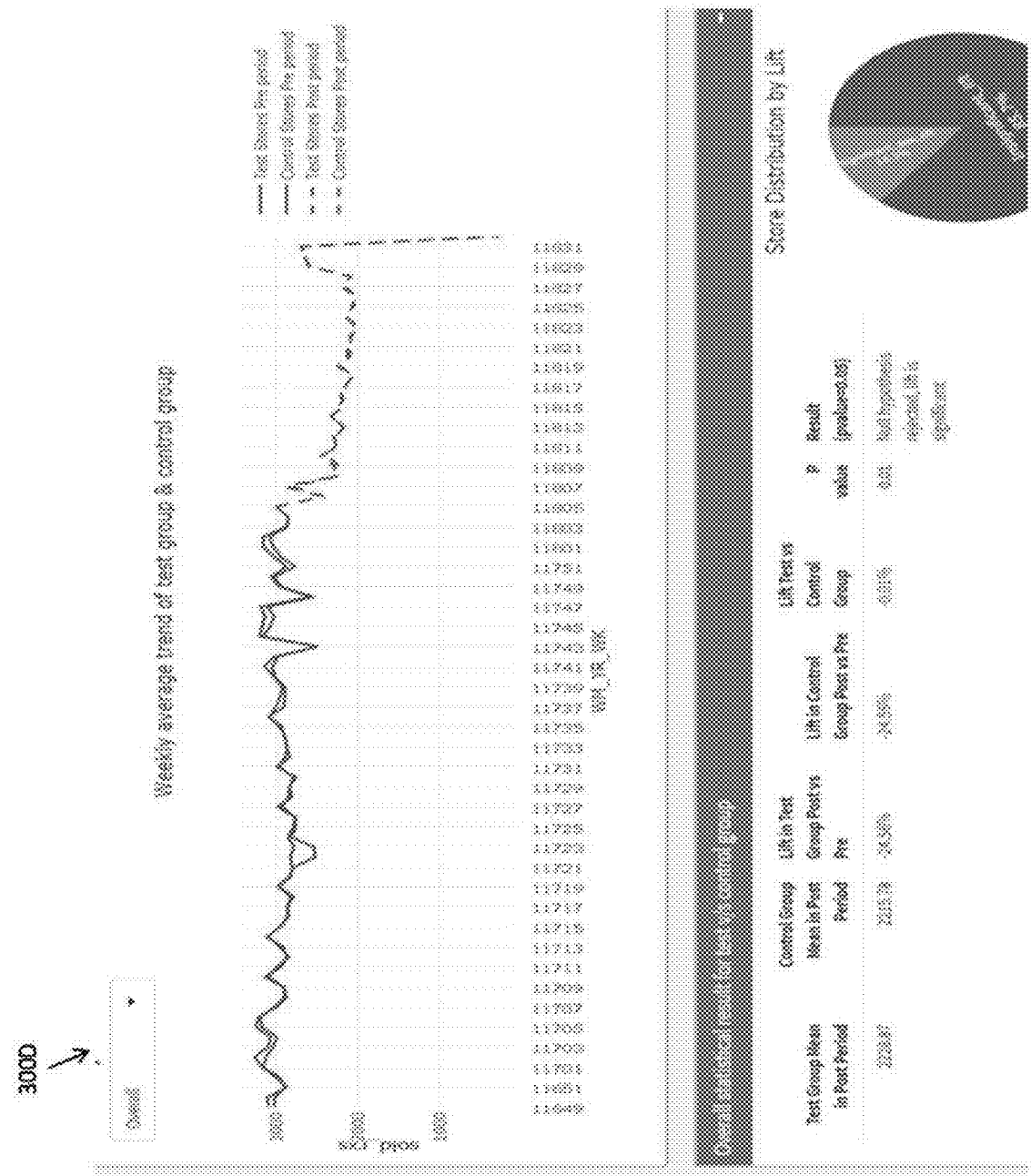

FIG. 3D illustrates a user interface in the form of a dashboard 300D for displaying results of the feature testing, according to an exemplary embodiment. The dashboard 300D is displayed on the user device and is communicatively coupled to the testing module. The dashboard 300D displays a plot of a weekly average trend of the test stores and the control stores. The plot lines are visually distinguished to show the test stores pre-period and the test stores post-period, and the control stores pre-period and the control stores post-period.

The dashboard 300D further displays overall statistical results for the test stores against the control stores. In an exemplary embodiment, the overall statistical results include a test stores mean in the post-period, the control stores mean in the post-period, lift in the test store post-period versus pre-period, lift in the control stores post-period versus pre-period, lift in the test stores versus the control stores, P value, and a result on whether to reject the null hypothesis when the lift is significant.

Figure 3E:

FIG. 3E illustrates a user interface in the form of a dashboard 300E for displaying results on whether to reject the null hypothesis for each of the test stores, according to an exemplary embodiment. The dashboard 300E is displayed on the user device and is communicatively coupled to the testing module. For each test store, the dashboard 300E displays a lift of the test store versus the control stores, a P value, and a result on whether the null hypothesis is rejected or valid.

Figure 4:
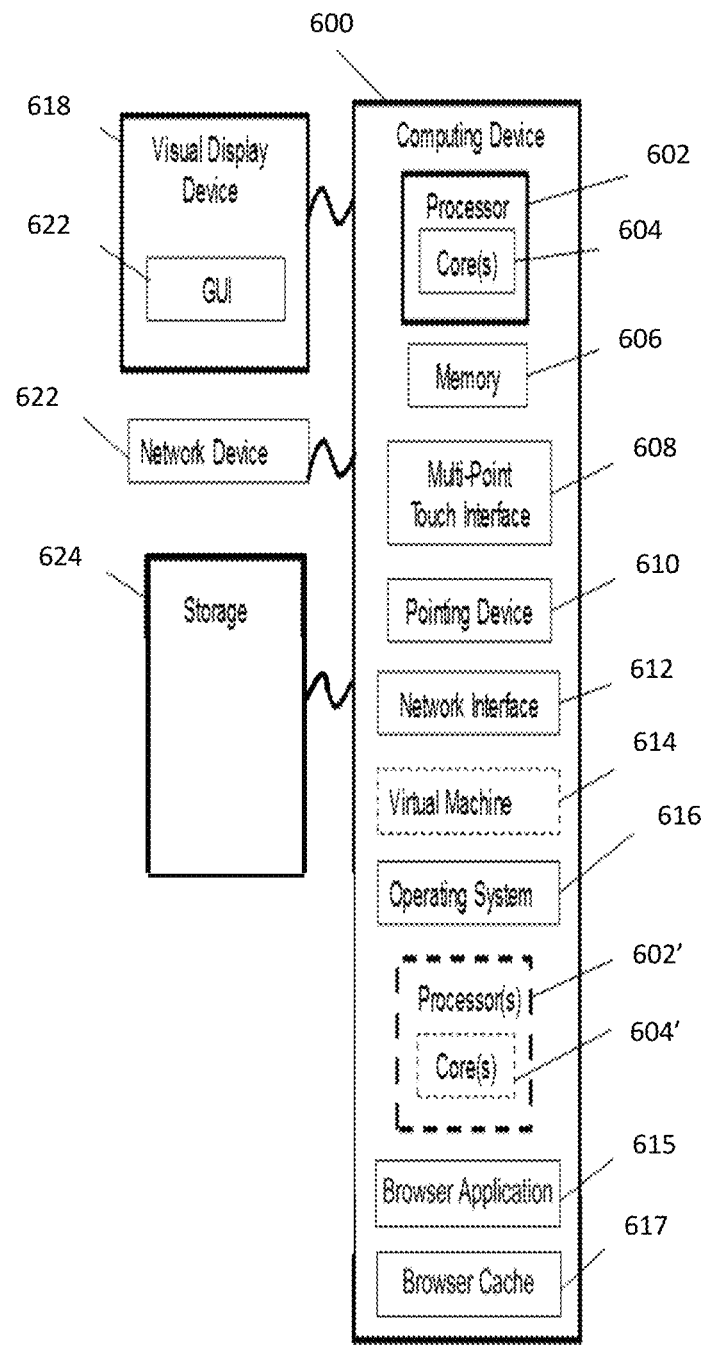
FIG. 4 is a block diagram of an exemplary computing device suitable for use in an exemplary embodiment.

FIG. 4 is a block diagram of an example computing device 600 that can be used to perform one or more steps provided by exemplary embodiments. In an exemplary embodiment, computing device 600 is computing device 102 and/or a user device 106 shown in FIG. 1. Computing device 600 includes one or more non-transitory computer-readable media for storing one or more computer-executable instructions or software for implementing exemplary embodiments such as the prioritization module described herein. The non-transitory computer-readable media can include, but are not limited to, one or more types of hardware memory, non-transitory tangible media (for example, one or more magnetic storage disks, one or more optical disks, one or more USB flash drives), and the like. For example, a memory 606 included in computing device 600 can store computer-readable and computer-executable instructions or software for implementing exemplary embodiments such as the prioritization module described herein. Computing device 600 also includes a processor 602 and an associated core 604, and optionally, one or more additional processor(s) 602' and associated core(s) 604' (for example, in the case of computer systems having multiple processors/cores), for executing computer-readable and computer-executable instructions or software stored in memory 606 and other programs for controlling system hardware. Processor 602 and processor(s) 602' can each be a single core processor or multiple core (604 and 604') processor.

Computing device 600 may include a browser application 615 and a browser cache 617. As described above, browser application 615 can enable a customer to view the dashboard display, including the user interfaces shown in FIGS. 3A-3E.

Virtualization can be employed in computing device 600 so that infrastructure and resources in the computing device can be shared dynamically. A virtual machine 614 can be provided to handle a process running on multiple processors so that the process appears to be using only one computing resource rather than multiple computing resources. Multiple virtual machines can also be used with one processor.

Memory 606 can include a computer system memory or random access memory, such as DRAM, SRAM, EDO RAM, and the like. Memory 606 can include other types of memory as well, or combinations thereof. In some embodiments, a customer can interact with computing device 600 through a visual display device 618, such as a touch screen display or computer monitor, which can display one or more customer interfaces 622 that can be provided in accordance with exemplary embodiments. Visual display device 618 may also display other aspects, elements and/or information or data associated with exemplary embodiments. Computing device 600 may include other I/O devices for receiving input from a customer, for example, a keyboard or any suitable multi-point touch interface 608, a pointing device 610 (e.g., a pen, stylus, mouse, or trackpad). The keyboard 608 and pointing device 610 may be coupled to visual display device 618. Computing device 600 may include other suitable conventional I/O peripherals.

Computing device 600 can also include one or more storage devices 624, such as a hard-drive, CD-ROM, or other computer readable media, for storing data and computer-readable instructions and/or software. Exemplary storage device 624 can also store one or more storage devices for storing any suitable information required to implement exemplary embodiments.

Computing device 600 can include a network interface 612 configured to interface via one or more network devices 622 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612 can include a built-in network adapter, network interface card, PCMCIA network card, card bus network adapter, wireless network adapter, USB network adapter, modem or any other device suitable for interfacing computing device 600 to any type of network capable of communication and performing the operations described herein. Moreover, computing device 600 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

Computing device 600 can run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616 can be run in native mode or emulated mode. In an exemplary embodiment, the operating system 616 can be run on one or more cloud machine instances.

The description herein is presented to enable any person skilled in the art to create and use a computer system configuration and related method and systems for measuring an impact of features implemented in one or more test stores and reconfiguring a computing system to executing determined policies. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component, or step. Likewise, a single element, component, or step can be replaced with a plurality of elements, components, or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions, and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. A system for determining effectiveness of feature changes made within a store, the system comprising:
   a computer network coupled to a test store, and a plurality of stores;

at least one data storage device coupled to the computer network and holding a plurality of data sets, each data set associated with the plurality of stores, each store identified by a store identifier, and each store represented by time series data related to a specified variable, in a specified period of time;

a dashboard display coupled to the computer network and configured to receive as input a feature and one of the store identifiers to identify the test store in which to test the feature, the feature including at least one of: a change in product price, product location, product-related service and product availability, and wherein the dashboard display is further configured to display results of the test; and a computing device coupled to the computer network and equipped with a memory and multiple processors configured to execute a testing module, the multiple processors forming a virtual machine to allow the test module to be executed on the multiple processors, the computing device communicatively coupled to the data storage device, and the dashboard display, wherein the testing module is further executed by the multiple processors for:

receiving, via the computer network, data associated with the store identifier for the test store and data associated with the plurality of stores;

transforming the time series data into respective feature vectors of the test store and the plurality of stores to be compared based on boundary conditions;

defining a Dynamic Time Warping (DTW) function according to at least a warping condition and the boundary conditions;

providing a computing kernel for the Dynamic Time Warping (DTW) function, in a programming language that rapidly performs alignment computations to allow cross-distance matrices to fit the memory, wherein performing the alignment computations comprises aligning two of a plurality of sequences of the respective feature vectors by iteratively warping a time axis, according to the warping condition, until an optimal match between the two sequences is found;

identifying, among the alignment computations, a best alignment between the two sequences by finding a path through a grid of the two sequences that minimizes a sum of distances between respective individual elements of the two sequences along the path;

identifying control stores from the plurality of stores for the test store identifier using the Dynamic Time Warping (DTW) function, and using the data associated with the test store identifier to rank a similarity of the control stores to the test store, wherein the control stores have comparable measurement values and follow a similar trend over a period of analysis as the test store based on a result of the Dynamic Time Warping (DTW);

receiving via the computer network at least one result from testing out the feature in the test store after the control stores are identified;

wherein the testing out of the feature is accomplished within the test store by at least one of: the changing of the product price of a selected product in the test store, the changing of the product location of the selected product within the test store, the changing of the product-related service at the test store, and the changing of the product availability of the selected product within the test store;

determining the at least one result of testing the feature in the test store is a change that is statistically significant from a related feature in the control stores; and displaying, via the dashboard display, the at least one result of determining whether the change made in the test store is statistically significant;

wherein the feature is selectively implemented at one of the plurality of the stores based upon determining that the change made in the test store is statistically significant.

2. The system of claim 1, wherein the testing module, when executed by the computing device, is further configured to generate scenarios and at least one comparison between scenario information.

3. The system of claim 2 wherein the dashboard display is configured to display the scenario information.

4. The system of claim 2, wherein the scenarios are performed using historical orders made during the specified time period.

5. The system of claim 1, wherein the dashboard display is further configured to display details regarding a lift of the test store and a distribution of the control stores according to the lift.

6. The system of claim 1, further comprising a machine learning module executed by the computing device to:
   segregate the control stores into similar clusters based on predefined factors;
   segregate the control stores by a time series clustering algorithm to continuously evaluate each control store and then decide which cluster a control store falls into; and
   change the predefined factors and re-segregate the control stores.

7. The system of claim 1, wherein the testing module is executed by the computing device, to:
   process the data associated with the plurality of stores using a time series clustering algorithm which segregates the plurality of stores into various clusters; and
   use the processed data as criteria to generate the control stores for the test store.

8. The system of claim 1 wherein the at least one result of the feature for the test store is evaluated based on at least one of: sales data, footfalls and wait time.

9. A computer implemented method for determining effectiveness of feature changes made within a store, the method comprising:
   storing, by at least one data storage device, a plurality of data sets, each data set associated with a plurality of stores, each store identified by a store identifier, and each store represented by time series data related to a specified variable, in a specified period of time;
   receiving, at a dashboard display, input of a feature and one of the store identifiers to identify a test store in which to test the feature, the feature including at least one of: a change in product price, product location, product- related service and product availability, and wherein the dashboard display is further configured to display results of the test;
   executing, by a computing device equipped with a memory and multiple processors, a testing module, to form, by the multiple processors, a virtual machine for allowing the test module to be executed on the multiple processors;
   receiving, via a computer network, data associated with the store identifier for the test store and data associated with the plurality of stores;

transforming, by the multiple processors, the time series data into respective feature vectors of the test store and the plurality of stores to be compared based on boundary conditions;

defining, by the multiple processors, a Dynamic Time Warping (DTW) function according to at least a warping condition and the boundary conditions;

providing, by the multiple processors, a computing kernel for the Dynamic Time Warping (DTW) function, in a programming language that rapidly performs alignment computations to allow cross-distance matrices to fit the memory, wherein performing the alignment computations comprises aligning two of a plurality of sequences of the respective feature vectors by iteratively warping a time axis, according to the warping condition, until an optimal match between the two sequences is found;

identifying, among the alignment computations, a best alignment between the two sequences by finding a path through a grid of the two sequences that minimizes a sum of distances between respective individual elements of the two sequences along the path;

identifying, by the multiple processors, control stores from the plurality of stores for the test store identifier using the Dynamic Time Warping (DTW) function, and using the data associated with the test store identifier to rank a similarity of the control stores to the test store, wherein the control stores have comparable measurement values and follow a similar trend over a period of analysis as the test store based on a result of the Dynamic Time Warping (DTW);

receiving via the computer network at least one result from testing out the feature in the test store after the control stores are identified;

wherein the testing out of the feature is accomplished within the test store by at least one of: the changing of the product price of a selected product in the test store, the changing of the product location of the selected product within the test store, the changing of the product-related service at the test store, and the changing of the product availability of the selected product within the test store;

determining, by the multiple processors, the at least one result of testing the feature in the test store is a change that is statistically significant from a related feature in the control stores; and displaying, via the dashboard display, the at least one result of determining whether the change made in the test store is statistically significant;

wherein the feature is selectively implemented at one of the plurality of the stores based upon determining that the change made in the test store is statistically significant.

10. The method of claim 9, further comprising:
executing, by the computing device, the testing module to generate scenarios and at least one comparison between scenario information.

11. The method of claim 10, further comprising:
displaying, by the dashboard display, the scenario information.

12. The method of claim 10, further comprising:
performing, by the multiple processors, the scenarios using historical orders made during the specified time period.

13. The method of claim 9, further comprising
displaying, by the dashboard display, details regarding a lift of the test store and a distribution of the control stores according to the lift.

14. The method of claim 9, further comprising:
segregating, by a machine learning module executed by the computing device, the control stores into similar clusters based on predefined factors;
segregating, by a machine learning module executed by the computing device, the control stores by a time series clustering algorithm to continuously evaluate each control store and then decide which cluster a control store falls into; and
change the predefined factors and re-segregate the control stores.

15. The method of claim 9, further comprising:
processing, by the testing module executed by the computing device, the data associated with the plurality of stores using a time series clustering algorithm which segregates the plurality of stores into various clusters; and
using, by the testing module executed by the computing device, the processed data as criteria to generate the control stores for the test store.

16. The method of claim 9 wherein the at least one result of the feature for the test store is evaluated based on at least one of: sales data, footfalls and wait time.

* * * * *